United States Patent
Lee et al.

(10) Patent No.: US 8,977,419 B2
(45) Date of Patent: Mar. 10, 2015

(54) DRIVING-BASED LANE OFFSET CONTROL FOR LANE CENTERING

(75) Inventors: Jin-Woo Lee, Rochester Hills, MI (US); Bakhtiar Brian Litkouhi, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 692 days.

(21) Appl. No.: 12/977,912

(22) Filed: Dec. 23, 2010

(65) Prior Publication Data

US 2012/0166032 A1 Jun. 28, 2012

(51) Int. Cl.
*B62D 6/00* (2006.01)
*B62D 15/00* (2006.01)
*B60W 30/12* (2006.01)
*B60W 50/08* (2012.01)
*B62D 1/28* (2006.01)
*B60W 50/00* (2006.01)

(52) U.S. Cl.
CPC ............... *B60W 30/12* (2013.01); *B60W 50/08* (2013.01); *B62D 1/28* (2013.01); *B62D 1/286* (2013.01); *B60W 2050/0073* (2013.01); *B60W 2050/0074* (2013.01); *B60W 2540/04* (2013.01)
USPC ...... 701/23; 701/41; 701/1; 701/93; 180/167; 180/168; 180/422; 340/988

(58) Field of Classification Search
USPC .................. 701/1, 41, 93; 180/167, 168, 422; 340/988
See application file for complete search history.

(56) References Cited

U.S. PATENT DOCUMENTS

| | | | |
|---|---|---|---|
| 7,510,038 B2 * | 3/2009 | Kaufmann et al. ........... 180/169 |
| 7,737,832 B2 | 6/2010 | Baratoff et al. |
| 8,392,064 B2 * | 3/2013 | Thrun et al. .................... 701/41 |
| 2009/0319113 A1 | 12/2009 | Lee |
| 2010/0082195 A1 | 4/2010 | Lee et al. |
| 2010/0152952 A1 | 6/2010 | Lee et al. |
| 2010/0228417 A1 | 9/2010 | Lee et al. |
| 2010/0228420 A1 | 9/2010 | Lee |

FOREIGN PATENT DOCUMENTS

EP 1 867 542 A1 12/2007

\* cited by examiner

*Primary Examiner* — Adam Tissot
(74) *Attorney, Agent, or Firm* — John A. Miller; Miller IP Group, PLC

(57) ABSTRACT

A system and method for providing adaptive lane centering in an autonomous or semi-autonomous vehicle driving system includes activating a lane centering control system, detecting a driver steering override of the lane centering control system, monitoring a lane centering offset when a driver override condition is detected, determining if the lane centering offset represents a driver bias and adjusting the lane centering offset in the lane centering control system to compensate for the driver bias.

15 Claims, 2 Drawing Sheets

DRIVING-BASED LANE OFFSET CONTROL FOR LANE CENTERING

BACKGROUND OF THE INVENTION

1. Field of the Invention

This invention relates generally to a system and method for adaptive lane centering in an autonomously driven vehicle and, more particularly, to a system and method for providing an adaptive driving-based lane offset control for the lane centering system.

2. Discussion of the Related Art

The operation of modern vehicles is becoming more autonomous, i.e., the vehicles are able to provide driving control with less driver intervention. Cruise control systems have been on vehicles for a number of years where the vehicle operator can set a particular speed of the vehicle, and the vehicle will maintain that speed without the driver operating the throttle. Adaptive cruise control systems have been recently developed in the art where not only does the system maintain the set speed, but also will automatically slow the vehicle down in the event that a slower moving preceding vehicle is detected using various sensors, such as radar and cameras. Other variations of modern vehicle control systems include autonomous parking where the vehicle will automatically provide the steering control for parking the vehicle, intervening if the driver makes harsh steering changes that may affect vehicle stability and lane centering capabilities where the vehicle system attempts to maintain the vehicle near the center of the lane. Further, fully autonomous vehicles have been demonstrated to drive in simulated urban traffic up to 30 mph, observing all of the rules of the road.

As vehicle systems improve, they will become more autonomous with the goal being a completely autonomously driven vehicle. For example, future vehicles will likely employ autonomous systems for lane changing, passing, turns away from traffic, turns into traffic, etc. As these systems become more prevalent in vehicle technology, it will also be necessary to determine what the driver's role will be in combination with these systems for controlling vehicle speed, steering and overriding the autonomous system.

Examples of such systems include U.S. patent application Ser. No. 12/399,317, titled "Model Based Predictive Control for Automated Lane Centering/Changing Control System," assigned to the assignee of this application and herein incorporated by reference, which discloses a system and method for providing steering angle control for lane centering and lane changing purposes in an autonomous or semi-autonomous vehicle. U.S. patent application Ser. No. 12/336,819, titled "Detection of Driver Intervention During a Torque Overlay Operation in an Electric Power Steering System," assigned to the assignee of this application and herein incorporated by reference, which discloses a system and method for controlling vehicle steering by detecting a driver intervention in a torque overly operation. However, to accommodate a wide array of personal driving preferences, the lane centering system needs to provide an adjustable lane centering offset control capability.

SUMMARY OF THE INVENTION

In accordance with the teachings of the present invention, a system and method are disclosed for providing adaptive lane centering in an autonomous or semi-autonomous vehicle driving system. The system and method include activating a lane centering control system, detecting a driver steering override of the lane centering control system, monitoring a lane centering offset when a driver override condition is detected, determining if the lane centering offset represents a driver bias and adjusting the lane centering offset in the lane centering control system to compensate for the driver bias.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for providing adaptive lane centering control in an autonomous or semi-autonomous vehicle is merely exemplary in nature, and is in no way intended to limit the invention or its applications or uses.

Figure 1:
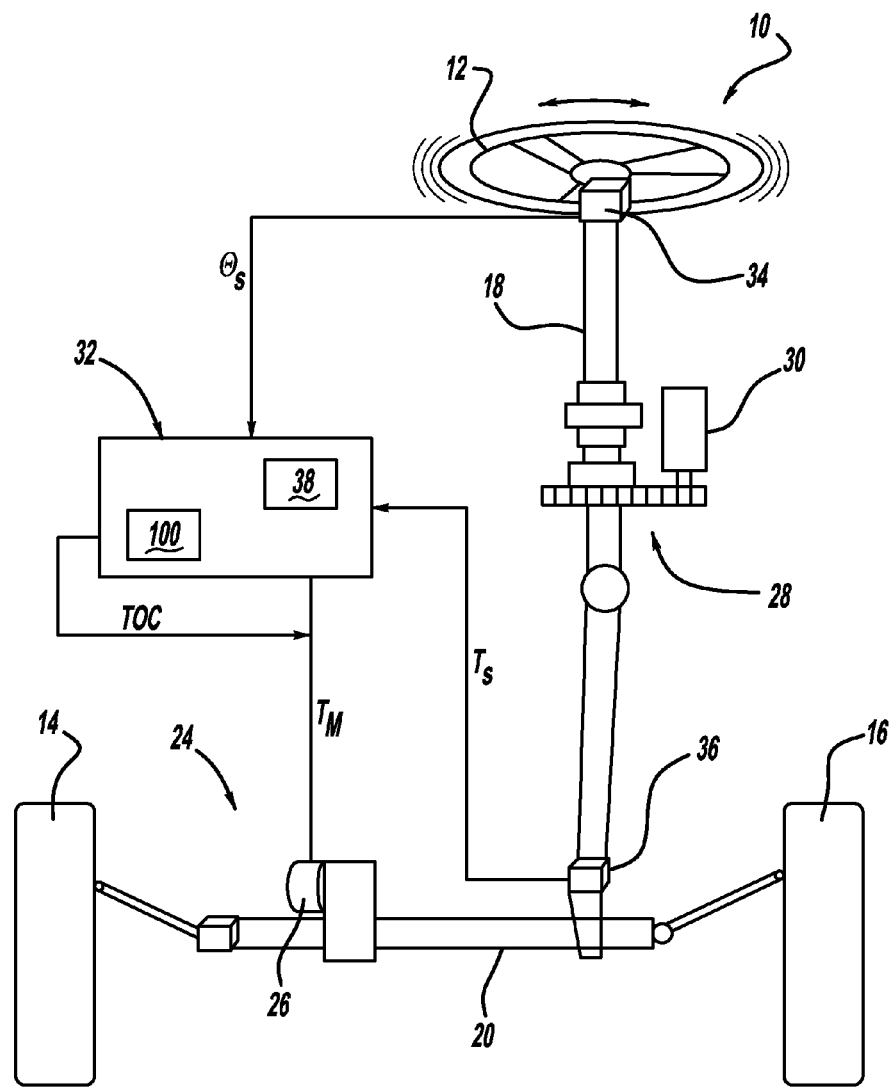
FIG. 1 illustrates an exemplary vehicle steering system according to an embodiment.

FIG. 1 illustrates an exemplary vehicle steering system 10 including a steering wheel 12 for road wheels 14 and 16 of a vehicle. The steering wheel 12 is coupled to the wheels 14 and 16 through a steering column 18 and an axle 20 in a manner that is well understood by those skilled in the art so that when the driver turns the steering wheel 12 the wheels 14 and 16 turn accordingly.

The steering system 10 includes an electric power steering (EPS) system 24 having an electric motor 26 mounted to the axle 20 that provides electric steering assist in response to the vehicle driver turning the steering wheel 12 in a manner that is well understood in the art. In other words, when the vehicle driver turns the steering wheel 12, the EPS system 24 turns the wheels 14 and 16 the amount commanded by the vehicle driver so that the turning of the wheels 14 and 16 on the roadway is easier. The vehicle system 10 may also include an active front steering (AFS) system 28 including an electric motor 30 mounted to the steering column 18. AFS systems are well known to those skilled in the art that provide additional steering, or corrective steering, in various types of vehicle stability control systems in connection with the vehicle driver turning the steering wheel 12, where the AFS system 28 decouples the steering wheel 12 from the wheels 14 and 16. The application of an AFS system according to the embodiment set forth above is merely exemplary in that one of ordinary skill in the art understands that an AFS system is not required to employ the adaptive lane centering system disclosed herein. Indeed, the adaptive lane centering system disclosed herein may be suitable for any vehicle system, with or without the use of AFS.

The steering system 10 includes an EPS electronic control unit (ECU) 32, which in one embodiment, is configured to provide overall EPS system control. The ECU 32 also includes an algorithm 100 for providing adaptive lane centering control in an autonomous or semi-autonomous vehicle. As understood by one of ordinary skill in the art, an EPS system 24 electrically assists a driver in the steering of a vehicle by applying a variable motor torque command ($T_M$) to steering motor 26 and, as needed, a torque overlay command (TOC) that alters the value of the motor torque command ($T_M$) during an EPS-assisted steering maneuver.

A steering angle sensor 34 mounted to the steering column 18 measures the rotation of the steering wheel 12 and the steering column 18 and provides a steering angle ($\theta_s$) signal indicative of same. A torque sensor 36 mounted to the steering column 18 measures the torque on the steering column 18 and provides a torque ($T_s$) signal indicative of same. The ECU 32 is in electrical communication with the angle sensor 34 and the torque sensor 36 such that the steering angle signal and steering torque signal are made available to the ECU 32 as well as to algorithm 100, which is readily accessible by the ECU 32. While the ECU 32 and algorithm 100 are shown as being collocated, the algorithm 100 can also be located separately from the ECU 32. The ECU 32 includes a microprocessor unit 38 that receives and processes a set of vehicle performance values, including the steering angle ($\theta_s$) and the steering torque ($T_s$), and that continuously monitors vehicle parameters such as, but not limited to, the speed of the vehicle. In addition, the ECU 32 may be configured to receive data from various lane detection sensors, which are generally mounted to the exterior of the vehicle. In many systems, the lane detection sensors include lane detection cameras mounted to the front of the vehicle, which are configured to sense lane markings affixed to the roadway. The lane markings generally indicate the boundaries defining the geometry of the lane, including the lane center. One of ordinary skill in the art understands that processors and ECUs other than ECU 32 may be used by the lane control system to monitor and determine the center of the lane.

Figure 2:
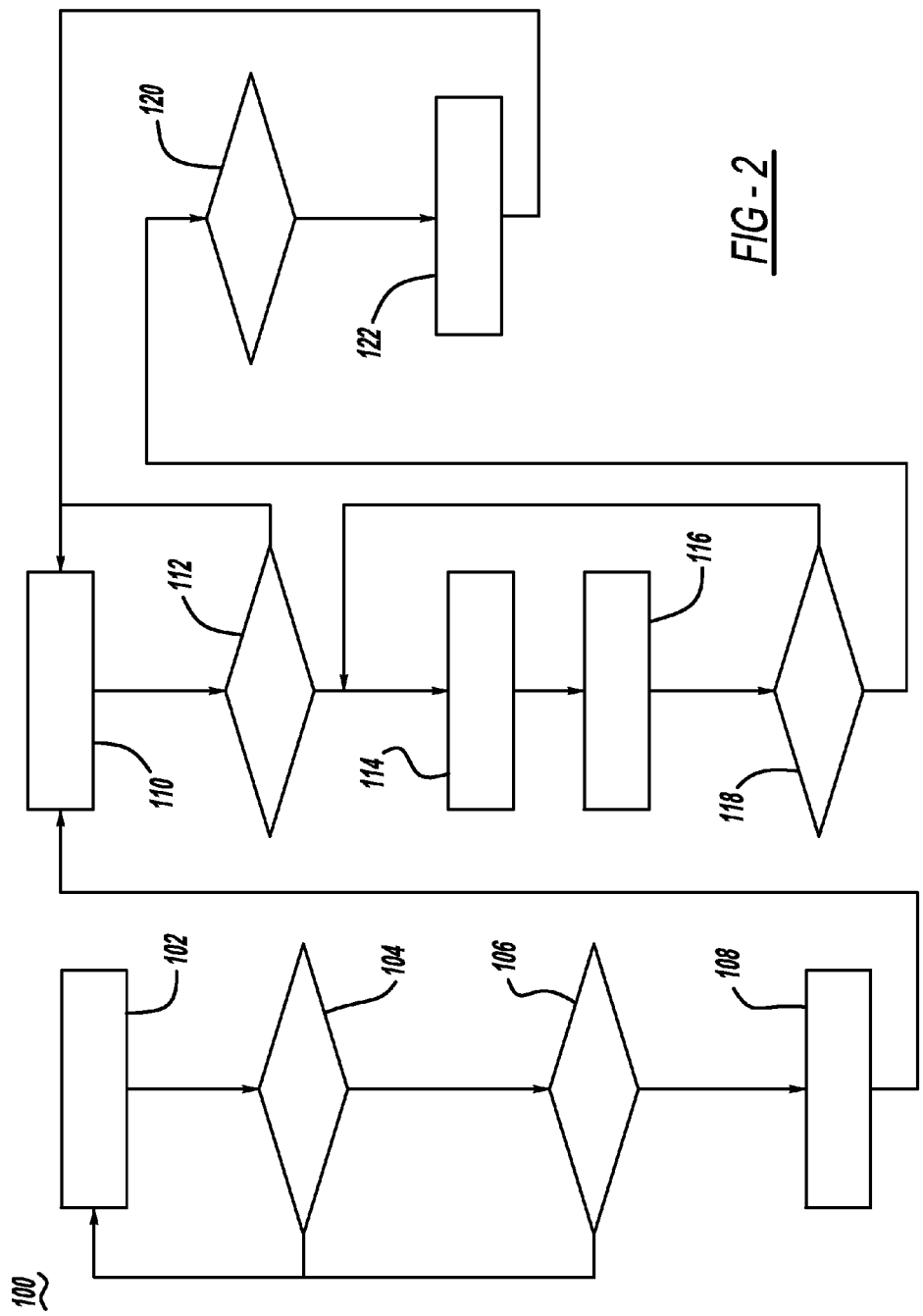
FIG. 2 illustrates an exemplary algorithm for providing adaptive lane centering control according to the system of FIG. 1.

FIG. 2 illustrates an exemplary algorithm 100 for providing adaptive lane centering control according to the system of FIG. 1. The lane centering control system is initially disengaged at step 102. At step 104 the algorithm determines if a driver request for lane centering has been initiated. If not, the lane centering system remains disengaged. If a request for initiation has been made, the algorithm determines at step 106 if lane centering is available. In some instances, the lane centering system of a vehicle may not be available due to circumstances such as, but not limited to, ECU or communication failures, errors relating to the detection sensors and actuators, or if the lane detection sensors are not able to detect the lane markings on the road. If the lane centering system is available, an initial lane offset is retrieved at step 108 from the lane detections sensors.

The initial lane offset may be set to zero indicating that there is no offset from lane center, or to a default value, which may be a system offset or an offset based on information previously derived for a particular driver. There are two types of lane offsets; one is a lane offset command from the driver, referred to as the driver's lane bias, and the other is the measurement from the lane detection sensors. When the system is initially engaged without the driver offset command, the initial value of the desired offset is set to zero. Alternatively when the driver has indicated a desired offset (i.e., driver lane bias), the system compares the offset measurements from the lane detections sensors to the driver's lane bias and controls the steering system to achieve or maintain the driver's desired offset. Once the offset has been retrieved, the lane centering system is engaged at step 110.

In general, lane centering systems control the vehicle in a lateral way to keep the vehicle driving on the center of lane. Based on lane markings and the lane detection sensors, the system finds the center of lane and creates a desired vehicle path. The lane centering system's control algorithm then sends a steering torque command to the steering actuator to keep the vehicle in the center of lane. In this way, the driver's hands may be taken off steering wheel and the vehicle can be driven autonomously.

During normal course driving, a driver may temporarily or consistently override the steering control at any time. In a temporary override, such as to avoid a road obstruction, the driver is aware that they are steering the vehicle away from the center of the lane and overriding the lane centering system. However, in some circumstances, the driver may not be consciously aware that they are attempting to override the system. For example, some drivers may have a subconscious tendency to error to the right or left side of a lane. This tendency may be to avoid vehicles in an adjacent lane, or simply a tendency to hug the shoulder of a lane. In either case, the override attempt produces an offset from lane center that is either temporary to avoid something in the road, or consistent indicating a habitual bias.

At step 112, the algorithm determines if the driver is attempting to override the lane centering system. As set forth above, during an EPS-assisted steering maneuver, such as lane centering control, the driver should be comfortable to surrender steering authority to the ECU 32, but should also be confident that manual control or override can be quickly obtained from the ECU 32 at the driver's discretion. Certain vehicle parameters are continuously monitored such that when a meaningful variance occurs from a simulated or calculated steering model, the torque overlay operation as described above for EPS-assisted maneuvers, can be automatically aborted or overridden. One example of a process for determining if a driver intends to override the lane centering system can be found in U.S. patent application Ser. No. 12/336,819, titled "Detection of Driver Intervention During a Torque Overlay Operation in an Electric Power Steering System", assigned to the assignee of this application and herein incorporated by reference.

Thus, if at step 112, the algorithm determines that there is no attempt by the driver to override the steering, the algorithm returns to step 110 where the lane centering remains engaged. If an intention to override the lane centering system is detected, steering control is relinquished to the driver at step 114.

At step 116, the algorithm 100 detects the amount of the driver's vehicle lateral offset from center of the lane. In one embodiment, this is a measurement that can be made using the existing lane detection sensors, such as the forward lane marking detection sensors that are used to control the lane centering function of the vehicle. An example of one such lane control system may be found in U.S. patent application Ser. No. 12/399,317, titled "Model Based Predictive Control for Automated Lane Centering/Changing Control System," assigned to the assignee of this application and herein incorporated by reference.

As the system continues to monitor the center lane offset, the algorithm determines at step 118 if the driver override of the lane centering system detected at step 112 has ended. To detect the steering override end, the algorithm monitors the consistency of the steering angle and the lane offset measurement over a period of time. If the variations between the steering angle and the lane offset measurements are larger than a predetermined threshold, the algorithm determines that the system is still under a driver override. If the variation is smaller than the predetermined threshold for a period of time, the algorithm determines that the override condition has ended.

Thus, if the algorithm determines that the override has not ended, the algorithm returns to step 114 and the system continues to relinquish steering control to the driver. If, however, the algorithm determines that the override condition has ended, the algorithm moves to step 120 and determines if the lane offset is consistent enough to establish a new lane offset.

More specifically, the algorithm determines if the lane offset is consistent such that a time and/or distance threshold has been reached indicating that the lane offset is not a temporary maneuver on behalf of the driver to avoid a road obstruction, but rather a driving bias. Therefore, if at step 120 the algorithm determines that the lane offset is not a consistent offset, the algorithm returns to step 110 and resumes the lane centering operation without changing the lane bias. If the algorithm determines that the lane offset has been constant for a particular period of time and/or reached a predetermined threshold, then the algorithm determines that the offset is habitual and not a temporary maneuver and sets a new lane offset in the lane centering control system to accommodate the driver's bias. The algorithm then returns to step 110 and engages the lane centering control system with the new lane offset.

The system described herein may be implemented on one or more suitable computing devices, which generally include applications that may be software applications tangibly embodied as a set of computer-executable instructions on a computer readable medium within the computing device. The computing device may be any one of a number of computing devices, such as a personal computer, processor, handheld computing device, etc.

Computing devices generally each include instructions executable by one or more devices such as those listed above. Computer-executable instructions may be compiled or interpreted from computer programs created using a variety of programming languages and/or technologies, including without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable media includes any medium that participates in providing data (e.g., instructions), which may be read by a computing device such as a computer. Non-volatile media includes, for example, optical or magnetic disks and other persistent memory. Volatile media include dynamic random access memory (DRAM), which typically constitutes a main memory. Common forms of computer-readable media include any medium from which a computer can read.

It is to be understood that the above description is intended to be illustrative and not restrictive. Many alternative approaches or applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that further developments will occur in the arts discussed herein, and that the disclosed systems and methods will be incorporated into such further examples. In sum, it should be understood that the invention is capable of modification and variation and is limited only by the following claims.

The present embodiments have been particular shown and described, which are merely illustrative of the best modes. It should be understood by those skilled in the art that various alternatives to the embodiments described herein may be employed in practicing the claims without departing from the spirit and scope of the invention and that the method and system within the scope of these claims and their equivalents be covered thereby. This description should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

All terms used in the claims are intended to be given their broadest reasonable construction and their ordinary meaning as understood by those skilled in the art unless an explicit indication to the contrary is made herein. In particular, use of the singular articles such as "a", "the", "said", etc. should be read to recite one or more of the indicated elements unless a claim recites an explicit limitation to the contrary.

What is claimed is:

1. A method for providing adaptive lane centering in an autonomous or semi-autonomous vehicle driving system, said method comprising:
    a controller for:
    activating a lane centering control;
    detecting a driver steering override during the lane centering control;
    monitoring a lane centering offset when a driver override condition is detected;
    determining if the lane centering offset represents a driver bias; and
    determining if the driver override condition has ended prior to determining if the offset is a driver bias by detecting if the lane centering variation is smaller than a predetermined threshold for a predetermined time; and
    adjusting the lane centering offset to compensate for the driver bias.

2. The method according to claim 1 wherein determining if the lane centering offset represents a driver bias includes determining if the lane centering offset is constant for a predetermined period of time.

3. The method according claim 1 further including activating the lane centering control in response to a request from the driver.

4. The method according to claim 1 further including relinquishing steering control to the driver if a driver override condition is detected.

5. The method according to claim 1 further including engaging the lane centering control with the driver bias offset.

6. The method according to claim 1 further including retrieving an initial lane offset prior to activating the lane centering control.

7. A system for providing vehicle steering control in an autonomous or semi-autonomous vehicle driving system, said system including non-transitory computer-readable storage medium with an executable program stored thereon, wherein the program instructs a controller to:
    activate a lane centering control;
    detect a driver steering override of the lane centering control;
    monitor a lane centering offset when a driver override condition is detected;
    determine if the lane centering offset represents a driver bias;
    determine if the driver override condition has ended prior to determining if the offset is a driver bias by detecting if the lane centering variation is smaller than a predetermined threshold for a period of time; and
    adjust the lane centering offset to compensate for the driver bias.

8. The system according to claim 7 wherein the driver steering override is detected using a steering angle sensor and a torque sensor.

9. The system according to claim 7 wherein determining if the lane centering offset represents a driver bias includes determining if the lane centering offset is constant for a predetermined period of time.

10. The system according claim 7 wherein the lane centering control is activated in response to a request from the driver.

11. The system according to claim 7 further including relinquishing steering control to the driver if a driver override condition is detected.

12. The system according to claim 7 the lane centering control is re-activated with the driver bias offset.

13. The system according to claim 7 further including retrieving an initial lane offset prior to activating the lane centering control.

14. A system for providing vehicle steering control in an autonomous or semi-autonomous vehicle driving system, said system comprising:

a controller programmed to provide:

means for activating a lane centering control;

means for detecting a driver steering override of the lane centering control system;

means for monitoring a lane centering offset when a driver override condition is detected;

means for determining if the lane centering offset represents a driver bias;

means for determining if the driver override condition has ended prior to determining if the offset is a driver bias by detecting if the lane centering variation is smaller than a predetermined threshold for a period of time; and means for adjusting the lane centering offset to compensate for the driver bias.

15. The system according to claim 14 further including a means for determining if the lane centering offset is constant for a predetermined period of time.

* * * * *

UNITED STATES PATENT AND TRADEMARK OFFICE
CERTIFICATE OF CORRECTION

| | | |
|---|---|---|
| PATENT NO. | : 8,977,419 B2 | Page 1 of 1 |
| APPLICATION NO. | : 12/977912 | |
| DATED | : March 10, 2015 | |
| INVENTOR(S) | : Jin-Woo Lee and Bakhtiar Brian Litkouhi | |

It is certified that error appears in the above-identified patent and that said Letters Patent is hereby corrected as shown below:

On the Title Page, Item (54) and in the Specification, Column 1:

Please correct the title of the invention:

DRIVING-BASED LANE OFFSET CONTROL FOR LANE CENTERING should be
--DRIVING-BASED LANE OFFSET CONTROL FOR LANE CENTERING SYSTEM--.

Signed and Sealed this
Fifteenth Day of September, 2015

Michelle K. Lee
*Director of the United States Patent and Trademark Office*